(12) United States Patent
Friesen et al.

(10) Patent No.: US 8,763,981 B2
(45) Date of Patent: Jul. 1, 2014

(54) OBJECT SUPPORT COLUMN

(75) Inventors: Vladimir Friesen, Andernach (DE); Stefan Probst, Niederfell (DE)

(73) Assignee: Stabilus GmbH, Koblenz (DE)

(*) Notice: Subject to any disclaimer, the term of this patent is extended or adjusted under 35 U.S.C. 154(b) by 195 days.

(21) Appl. No.: 12/942,397

(22) Filed: Nov. 9, 2010

(65) Prior Publication Data

US 2011/0139957 A1 Jun. 16, 2011

(30) Foreign Application Priority Data

Dec. 16, 2009 (DE) .................... 10 2009 058 647

(51) Int. Cl.
*F16M 13/00* (2006.01)

(52) U.S. Cl.
USPC ............ 248/565; 248/580; 248/622; 267/131

(58) Field of Classification Search
USPC .............. 248/161, 560, 562, 565, 580, 622; 267/131

See application file for complete search history.

(56) References Cited

U.S. PATENT DOCUMENTS

| | | | | | |
|---|---|---|---|---|---|
| 3,790,119 | A | * | 2/1974 | Bauer | 248/562 |
| 3,913,901 | A | * | 10/1975 | Molders | 267/34 |
| 3,921,952 | A | * | 11/1975 | Wirges | 248/404 |
| 4,756,496 | A | | 7/1988 | Hosan et al. | |
| 4,940,202 | A | * | 7/1990 | Hosan et al. | 248/162.1 |
| 4,969,619 | A | * | 11/1990 | Bauer et al. | 248/161 |
| 5,078,351 | A | * | 1/1992 | Gualtieri | 248/161 |
| 5,188,345 | A | * | 2/1993 | Siegner et al. | 267/131 |
| 5,284,312 | A | * | 2/1994 | Dony | 248/161 |
| 5,806,828 | A | * | 9/1998 | Rothe et al. | 248/631 |
| 5,944,290 | A | * | 8/1999 | Fuhrmann et al. | 248/161 |
| 5,992,815 | A | * | 11/1999 | Metzdorf et al. | 248/631 |
| 7,328,875 | B2 | * | 2/2008 | Kastner et al. | 248/161 |
| 7,845,602 | B1 | * | 12/2010 | Young et al. | 248/125.8 |
| 2005/0161559 | A1 | * | 7/2005 | Kastner et al. | 248/161 |
| 2008/0258021 | A1 | * | 10/2008 | Etzkorn et al. | 248/157 |

FOREIGN PATENT DOCUMENTS

| DE | 34 20 528 | 12/1985 |
|---|---|---|
| DE | 10 2006 027 987 | 12/2007 |

* cited by examiner

*Primary Examiner* — Bradley Duckworth
(74) *Attorney, Agent, or Firm* — Cozen O'Connor

(57) ABSTRACT

An object support column with a vertical tube, a base part arranged at a first end of the vertical tube, a guide bush fastened to a second end of the vertical tube, a telescope tube arranged coaxially in the vertical tube and movable along a center longitudinal axis in the guide bush. A guide tube arranged in a pressure tube. A piston is guided in the guide tube. A piston rod is fastened to the piston, and extends through a second work chamber guided outward by a sealing and guiding device at a first end of the pressure tube and is arranged with its other end at the base part of the vertical tube. A flow connection between the first work chamber and the second work chamber can be shut off by a valve which can be actuated by an actuating device. The pressure tube is arranged to be movable along the center longitudinal axis relative to the telescope tube.

6 Claims, 6 Drawing Sheets

OBJECT SUPPORT COLUMN

BACKGROUND OF THE INVENTION

1. Field of the Invention

The invention is directed to an object support column with a vertical tube, a base part arranged at a first end of the vertical tube, a guide bush fastened to a second end of the vertical tube opposite the base part, a telescope tube arranged coaxially in the vertical tube that is movable along a center longitudinal axis in the guide bush, a pressure tube of a gas spring filled with a compressed gas, a guide tube arranged in the pressure tube, a piston guided in the guide tube that divides the pressure tube into a first work chamber and a second work chamber, a piston rod fastened by one end to the piston extends through the second work chamber guided outward to be sealed by a sealing and guiding device at a first end of the pressure tube and is arranged with its other end at the base part of the vertical tube, and a flow connection between the first work chamber and the second work chamber that can be shut off by a valve actuated by an actuating device.

2. Description of the Related Art

A generic object support column of this kind is known from DE 34 20 528 C2.

However, a disadvantage in object support columns is that they do not allow the load to be detected and, therefore, do not make it possible to adapt a chair mechanism to the weight of an occupant of the chair. A chair mechanism adapted to the weight of the occupant of the chair, for example, when the backrest is preloaded, would be desirable for keeping up with the demands of chair users with respect to comfort, which have increased since the prior art.

A solution is suggested in DE 10 2006 027 987 B3. The object support column presented therein comprises a gas spring with a first piston rod for length adjustment and a second piston rod for load detection of the gas spring. The second piston rod cooperates with a force accumulator which generates a preloading force on the second piston rod. The preloading force generated by the force accumulator prevents the second piston rod from being pushed out in the unloaded state of the gas spring and acts as a defined opposing force for the push-out force acting on the second piston rod in the loaded state of the gas spring. The second piston rod is pushed out of the housing in a defined manner against the preloading force in the loaded state when, for example, a chair user sits on a chair outfitted with the gas spring. The push-out path of the second piston rod is a measure of the loading of the gas spring, and the push-out movement serves at the same time for the mechanical adaptation of the chair mechanism.

Aside from the large installation space that is required, it is disadvantageous that information about the loading of the object support column and about the weight of the user of the chair is detected either incompletely or not at all depending on the stroke position. When the piston rod is completely pushed into the pressure tube of the gas spring, the end of the pressure tube on the piston rod side comes into contact with a stop buffer. A further deflection of the gas spring is no longer possible and the work chamber between the piston of the first piston rod and the piston of the second piston rod cannot be subjected to compression. Accordingly, the second piston rod cannot be moved out any farther so that information about the loading of the gas spring in turn is not detected and cannot be passed into the seat mechanism.

The seat loading of the gas spring by a determined weight force can be associated with a definite spring stroke. When the gas spring is in a position in which the stroke range which is still available is less than the spring stroke associated with the determined weight force, the spring stroke can no longer be realized in its entirety so that information about the loading of the gas spring is erroneously detected and cannot be correctly conveyed to the seat mechanism.

SUMMARY OF THE INVENTION

It is an object of the invention to provide an object support column that is adjustable in length and makes possible a reliable and continual detection of load in any desired position that occupies little installation space.

According to one embodiment of the invention, the pressure tube is arranged so as to be movable along the center longitudinal axis relative to the telescope tube.

According to one embodiment of the invention, a spring element, which preloads the pressure tube toward a second end of the telescope tube opposite the first end of the telescope tube, is arranged between a second end of the pressure tube remote of the piston rod and a first end of the telescope tube. A spring element, allows for spring constants, which are already adapted to certain chairs in a predefined manner, to be implemented during assembly.

In one embodiment, a hollow rod is guided out of the second end of the pressure tube and extends through an opening at the first end of the telescope tube, the hollow rod being immovably fixed in the pressure tube. Seals which are moved along the inner wall of the pressure tube can be dispensed with owing to the fixating of the hollow rod, which results in reduced wear.

To prevent tilting of the pressure tube of the gas spring in the telescope tube, a guide ring is arranged at the first end of the telescope tube and a guide cup is arranged at the first end of the pressure tube, the gas spring being guided so as to be axially movable in the telescope tube by the guide ring and guide cup.

A particularly reliable operation of the object support column can be achieved in that the hollow rod has a first step and a second step, and the hollow rod comprises a first portion, a second portion adjoining the first portion, and a third portion adjoining the second portion, and the outer diameter of the second portion has a greater outer diameter than the first portion, and the outer diameter of the third portion is greater than the outer diameter of the second portion.

In one embodiment, at least one stop device with which the guide cup can be brought into contact is advantageously provided at the second end of the telescope tube.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiment examples of the invention are shown in the drawings and described more fully in the following. In the drawings.

DETAILED DESCRIPTION OF THE PRESENTLY PREFERRED EMBODIMENTS

Figure 1:
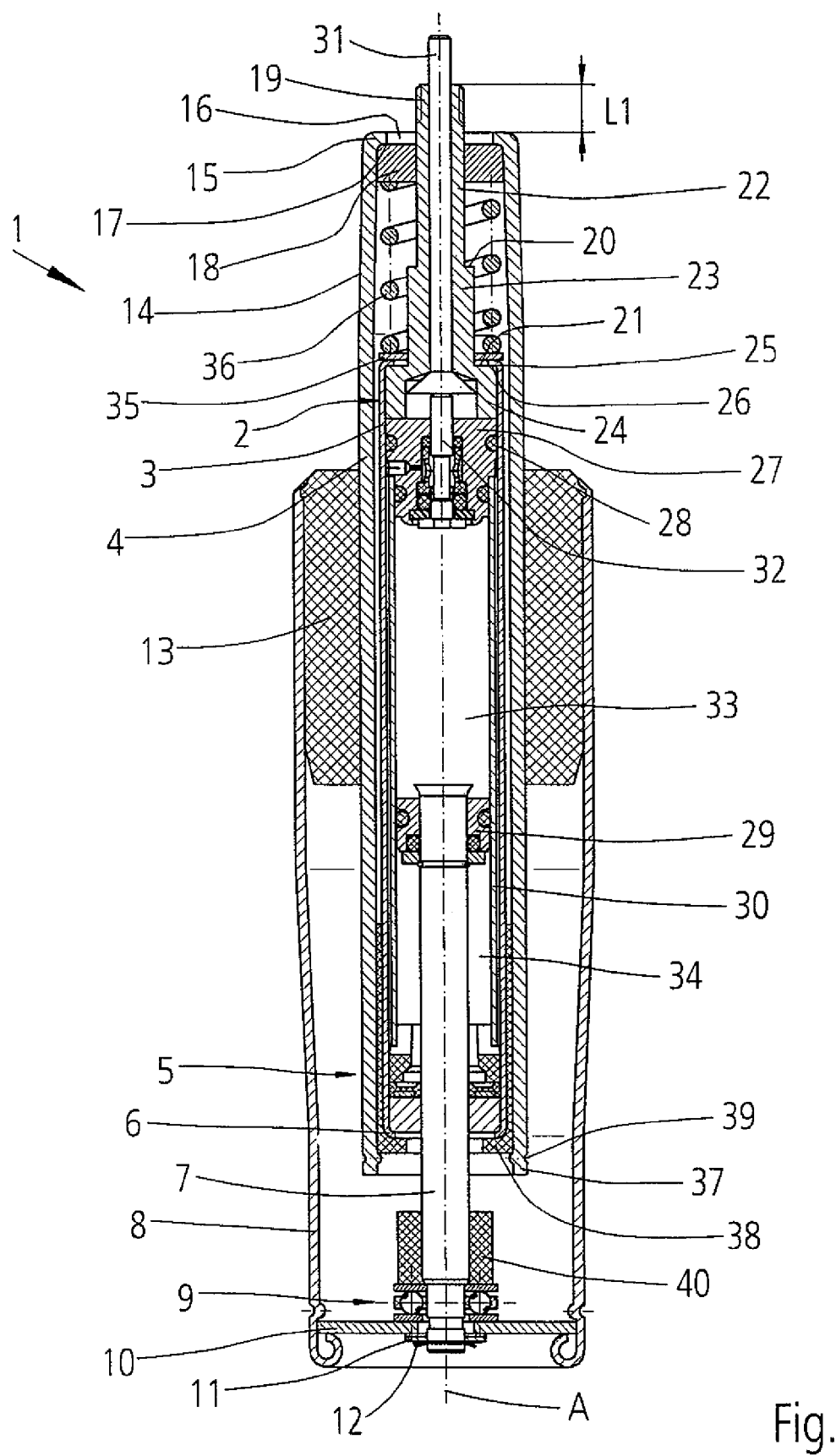
FIG. 1 is an axial section through a gas spring.

The continuously adjustable object support column 1 for chairs, tables or the like objects shown in FIGS. 1 to 4 has a locking gas spring 2 with a pressure tube 3 arranged coaxially in a telescope tube 4 to be axially displaceable along a center longitudinal axis A. A piston rod 7 exiting downward from a first end 6 of the locking gas spring 1 by a sealing and guiding device 5 is connected to a vertical tube 8. The piston rod 7 is supported at a base part 10 of the vertical tube 8 by an axial bearing 9 and is accordingly connected by one or more ring washers 11 and a cotter pin 12. The telescope tube 4, which is guided in the vertical tube 8 via a guide bush 13, has at its upper end a cone 14 for fastening in a corresponding complementary cone of a chair seat support or other vertically adjustable object, not shown. At the upper end, the cone 14 is provided with a flanged first end 15 so that an opening 16 is created. The flanged first end 15 of the telescope tube 4 serves as a stop 17 for a guide ring 18.

A hollow rod 19 extends through the opening 16 and guide ring 18 into the pressure tube 3 of the gas spring 2. The hollow rod 19 has a first step 20 and a second step 21 so that the hollow rod 19 is divided into three portions with different outer diameters. A first portion 22 extends through the guide ring 15 and the opening 13. A second portion 23 having a greater diameter connects the first portion 22 to a third portion 24 which is arranged inside the pressure tube 3 of the gas spring 2 and which has a greater outer diameter than the second portion 23. The outer diameter of the third portion corresponds substantially to the inner diameter of the pressure tube 3 or is slightly smaller.

The second end 25 of the pressure tube 3 is flanged circumferentially relative to the center longitudinal axis forms a stop 26 for the second step 21. To fix the hollow rod 19 in the pressure tube 3 of the gas spring 2, a valve body 27 contacts the end of the hollow rod 19 projecting into the pressure tube 3. A sealing ring 28 arranged at the valve body 27 seals the interior of the pressure tube 3 relative to the outer environment. A guide tube 30 which is provided for guiding a piston 29 arranged at the piston rod 7 contacts the valve body 27 by one of its ends and contacts the sealing and guiding device 5 by its other end, this sealing and guiding device 5 in turn being located in contact with the flanged first end 6 of the gas spring 2.

A tappet 31 extends through the hollow rod 19 and can act on a valve stem 32 of a valve projecting out of the valve body 27 in the direction of the opening 16 to open or close a flow connection between a first work chamber 33 in the gas spring 2 remote of the piston rod and a second work chamber 34 in the gas spring 2 proximal to the piston rod, these work chambers 33 and 34 being separated from one another by the piston 29.

A supporting disk 35 is arranged at the second end 25 of the pressure tube 3 outside of the gas spring 2. This supporting disk 35 improves the contact surface of a spring element 36 arranged between the guide ring 18 and the second end 25 of the pressure tube 3.

The spring element 36 forces the pressure tube 3 of the gas spring 2 towards the second end 37 of the telescope tube 4. A guide cup 38 is pressed onto the first end 6 of the pressure tube 3 and allows the gas spring 2 to displace in axial direction in the telescope tube 4 at least virtually without play. Near the second end 37 of the telescope tube 4, a stop device 39, which can be formed by a bead or by a plurality of dimples, projects into the interior of the telescope tube 4.

FIG. 1 shows the unloaded object support column 1 in which the gas spring 2 is locked in an optional intermediate position. The spring element 36 forces the pressure tube 3 of the gas spring 2 in the direction of the second end 37 of the telescope tube 4, and the guide cup 38 comes into contact with the stop device 39. In so doing, part of the first portion 22 of the hollow rod 19 projects out of the telescope tube 4 by length L1.

Figure 2:
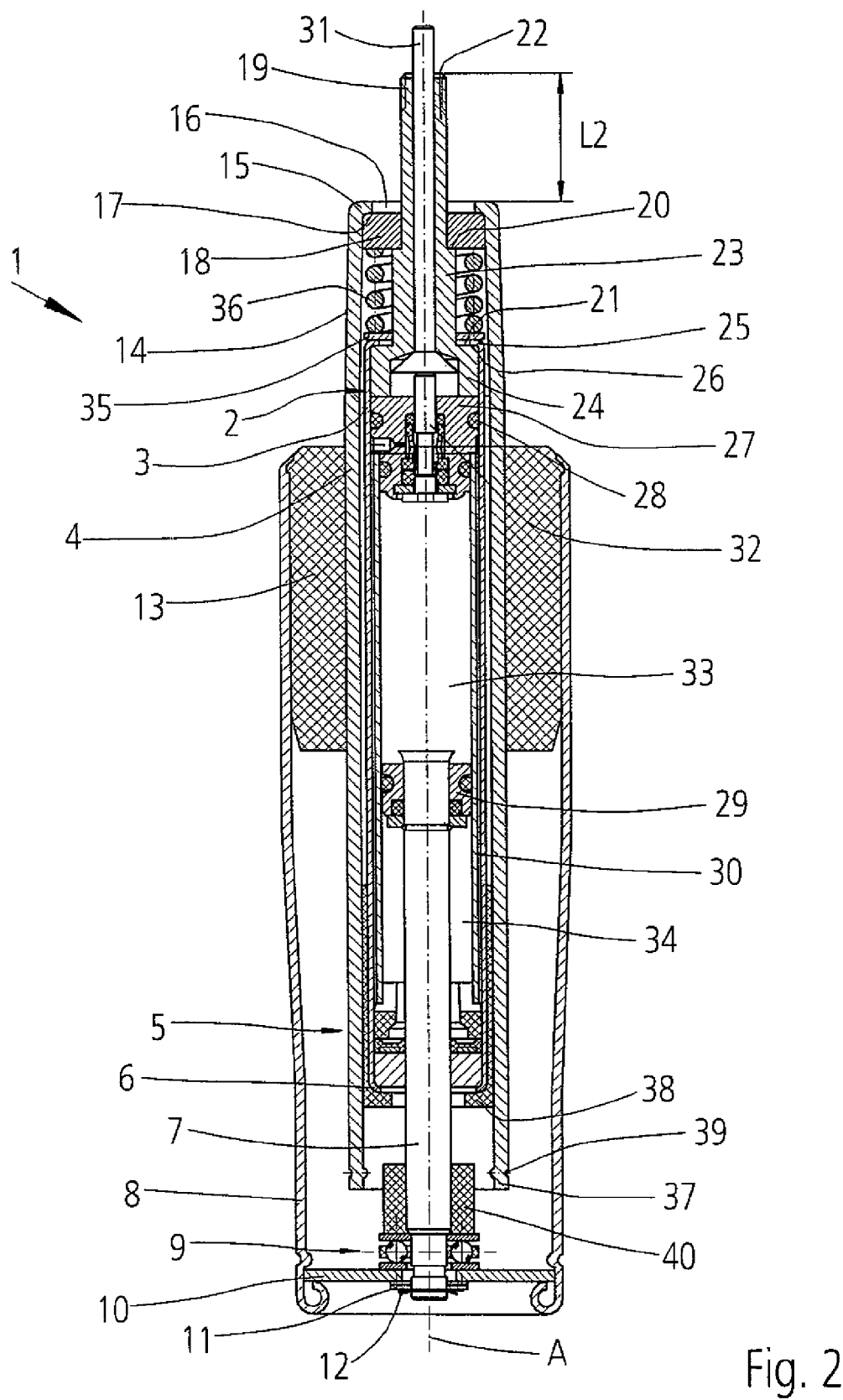
FIG. 2 is an axial section through a gas spring.

FIG. 2 shows the loaded object support column 1 with a gas spring which is locked at an intermediate position. The first step 20 contacts the guide ring 18 to prevent a compression of the spring element 36 reaching a hard stop. The telescope tube 4 penetrates deeper into the vertical tube 8 compared to FIG. 1 so that the first portion 22 projects out of the telescope tube 4 by length L2. Length L2 is greater than length L1.

Figure 3:
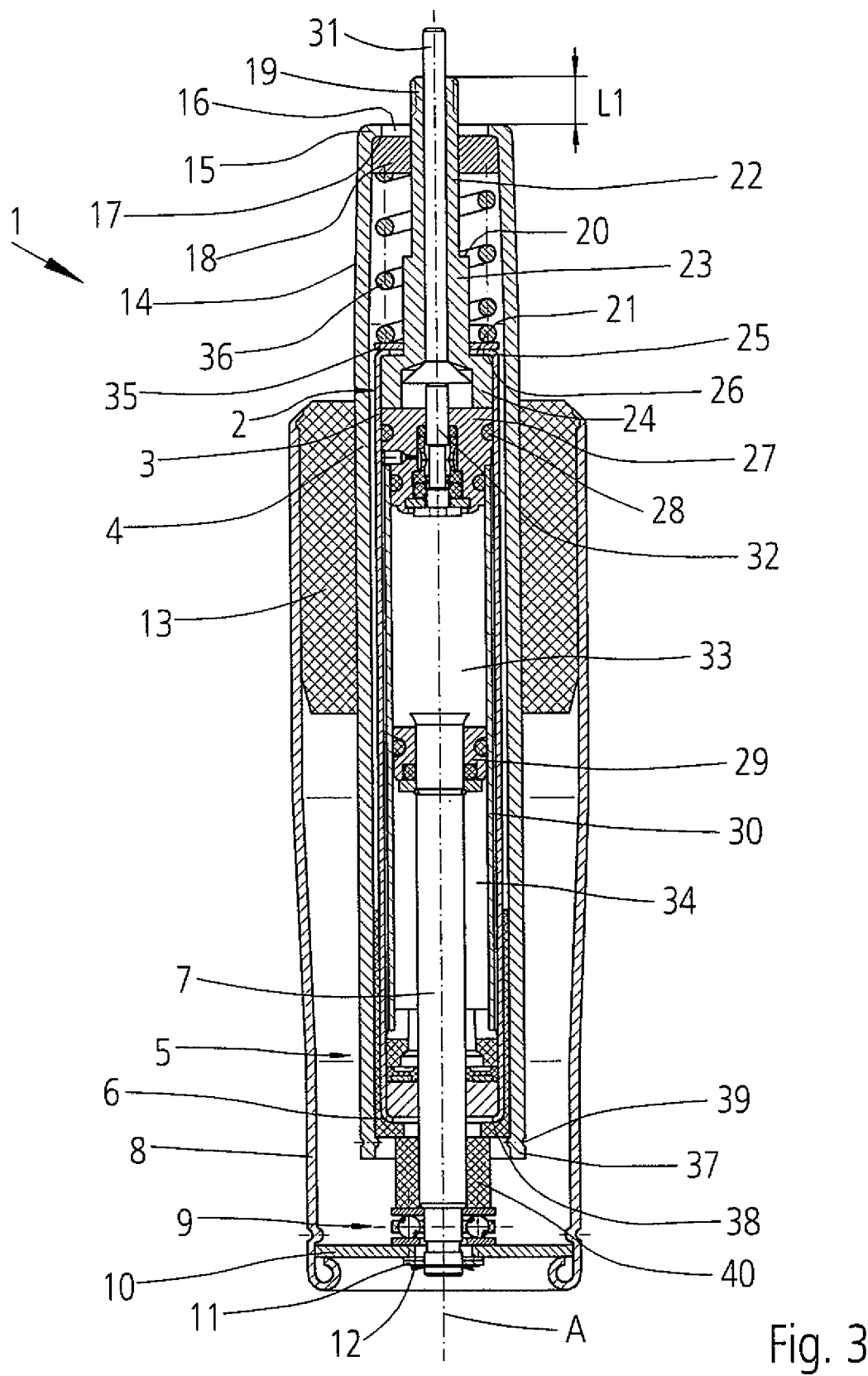
FIG. 3 is an axial section through a gas spring.

FIG. 3 in turn shows the unloaded object support column 1 in which the piston rod 7 is pushed into the pressure tube 3 of the gas spring 2 until the guide cup 38 contacts a stop buffer 40 arranged in the vicinity of the axial bearing 9 and which surrounds the piston rod 7 at that location. The gas spring is locked in this position. The first portion 22 of the hollow rod 19 in turn projects out of the telescope tube 4 by length L1.

Figure 4:
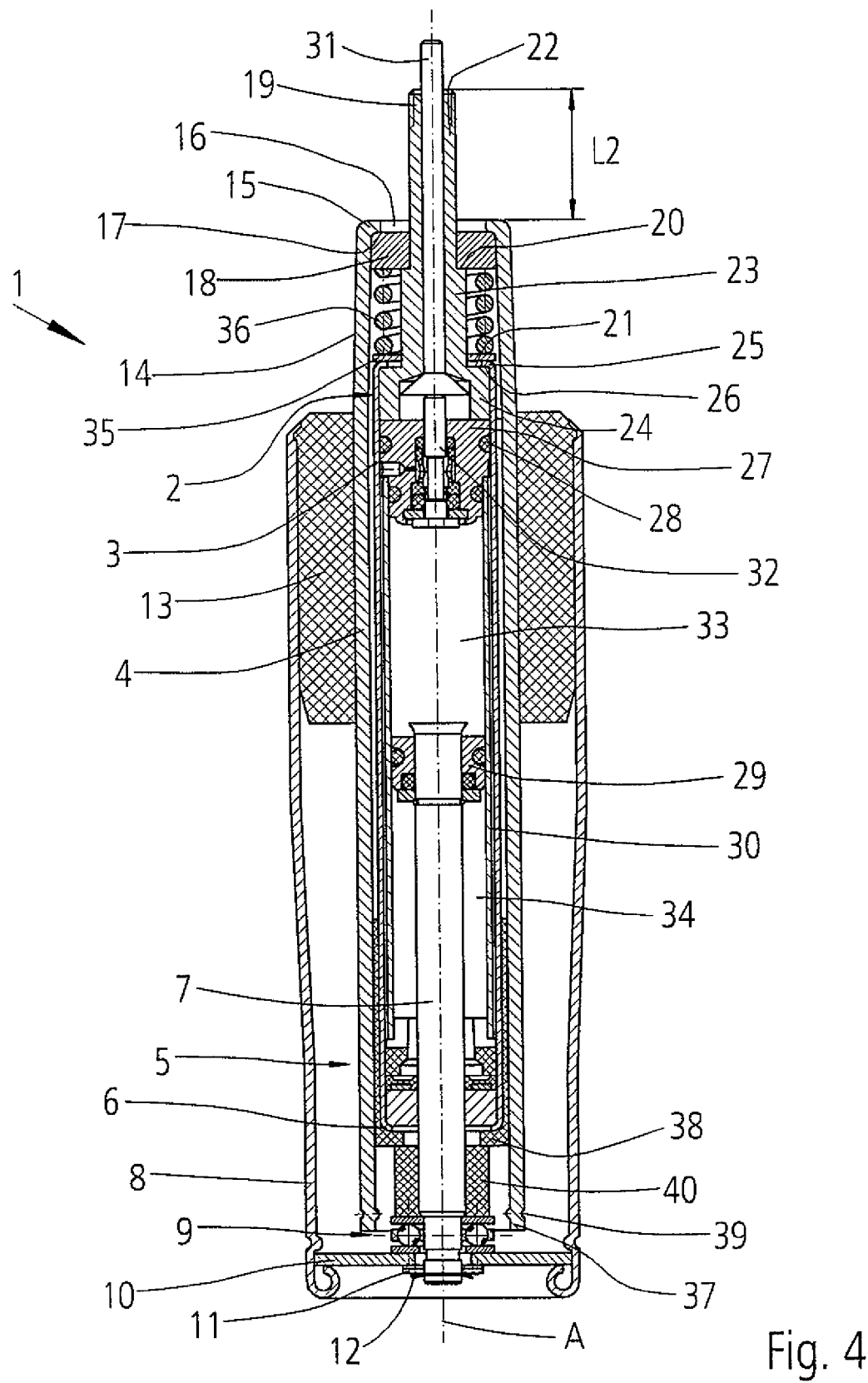
FIG. 4 is an axial section through a gas spring.

When the object support column is subjected to a loading force exceeding the spring force of the spring element 36 as is shown in FIG. 4, the telescope tube 4 penetrates deeper into the vertical tube so that the first portion 22 projects out of the telescope tube 4 by length L2. As was already described with reference to FIGS. 1 and 2, length L2 is multiple times greater than length L1.

Figure 5:
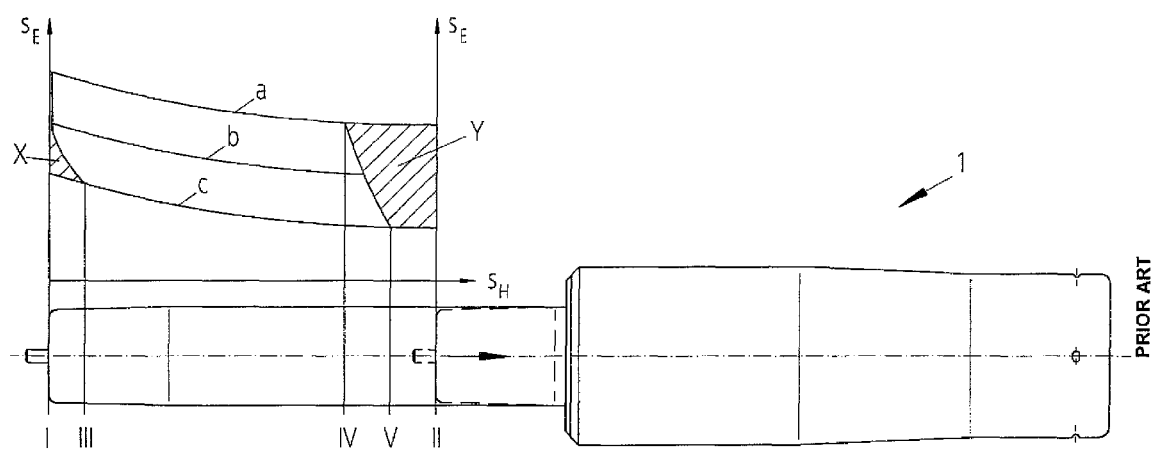
FIG. 5 is a diagram showing the characteristic curves for the prior art.
Figure 6:
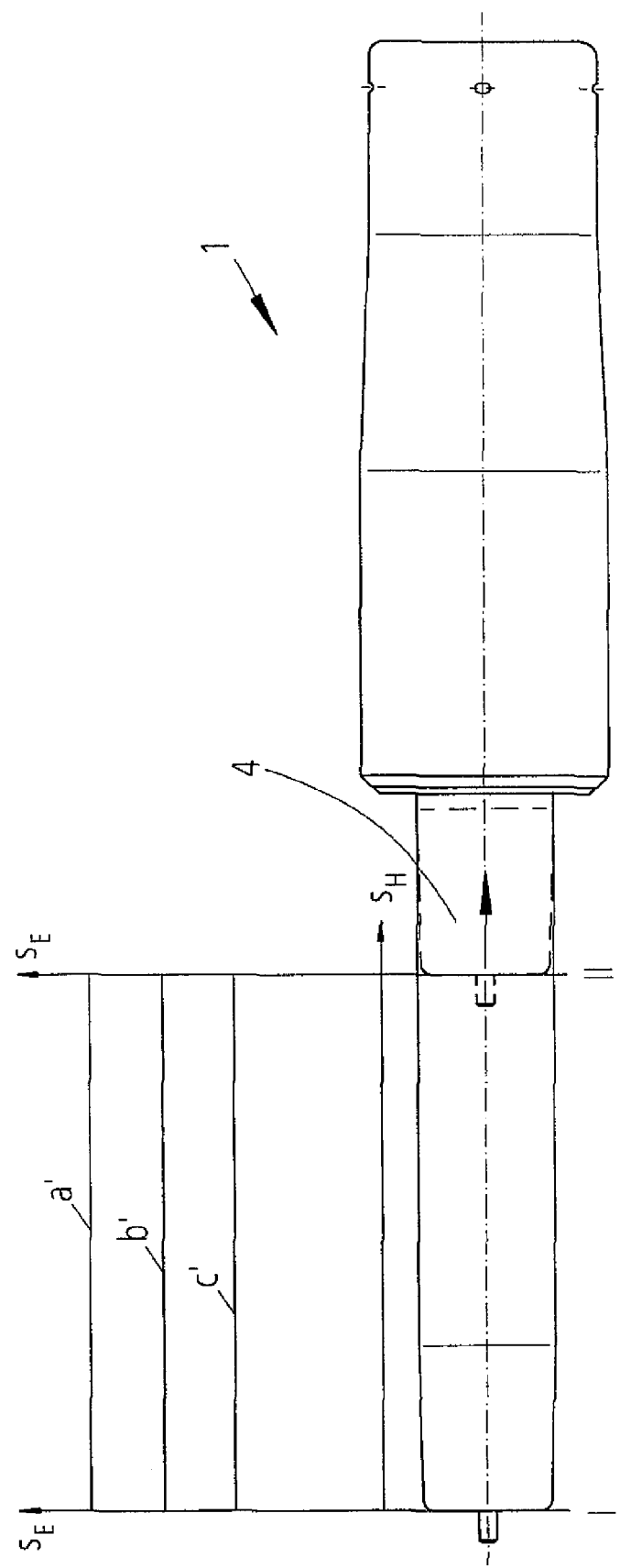
FIG. 6 is a diagram showing the characteristic curves of the present invention.

FIG. 5 and FIG. 6 each show a characteristic curve diagram which illustrates the advantages of the present invention over the prior art. The associated position of the object support column 1 is indicated below the abscissa, which indicates the stroke $s_H$ of the pressure tube of the gas spring in the prior art and of the telescope tube 4 in the present invention. The solid lines show the object support column 1 in the completely extended position designated by operating point I. The dashed lines correspond to the completely retracted position which is assigned an operating point II. The ordinates represent the spring deflection $S_E$.

A heavy loading of the object support column 1, for example, by a heavy person seated on a chair, is shown in FIG. 5 by a characteristic curve a and in FIG. 6 by characteristic curve a'. A medium loading of the object support column 1 is shown correspondingly by a characteristic curve b and b', respectively, and a light loading of the object support column 1, for example, by a light person seated on a chair, is shown by characteristic curve c and c', respectively.

In the prior art shown in FIG. 5, a part of the load force is needed to compensate for the push-out force of the gas spring when the gas spring is completely extended so that the functioning of the weight detection is prone to error. The smaller the loading of the object support column 1, the greater the influence of these errors. The range of error is shown by the hatched area X.

When the gas spring is moved in until it reaches an operating point IV, the end of the pressure tube on the piston rod side contacts a stop buffer, not shown, when the object support column 1 is heavily loaded. When the gas spring 2 is displaced farther in the direction of operating point II, the possible spring deflection continues to decrease until further deflection of the gas spring is no longer possible at all at operating point II, and the work chamber between the piston of the first piston rod and the piston of the second piston rod cannot be subjected to further compression. Accordingly, the second piston rod cannot be moved out any farther so that information about the loading of the gas spring cannot be detected and cannot be conveyed to the seat mechanism.

When the object support column 1 is loaded by a light load corresponding to characteristic curves b and c, the operating point IV shifts to an operating point V. From this point onward, the functioning of the weight detection is likewise prone to error. This range of error is represented by a hatched area Y.

FIG. 6 shows characteristic curves a', when the object support column 1 is heavily loaded, b' with a medium load, and c' with a small load in the present invention. It can be seen that there are no areas in which the functioning of the load detection is prone to error or in which this functioning is absent. Further, the characteristic curves a', b' and c' extend parallel to the abscissa and do not have a parabolic shape because the load detection is decoupled from the pressure ratios in the interior of the pressure tube 3 of the gas spring 2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An object support column comprising:
    a vertical tube;
    a base part arranged at a first end of the vertical tube;
    a guide bush fastened to a second end of the vertical tube opposite the base part;
    a telescope tube movable along a center longitudinal axis in the guide bush arranged coaxially in the vertical tube, the telescope tube having a first end and a second end opposite the first end of the telescope tube;
    a pressure tube of a gas spring filled with a compressed gas, the pressure tube having a first end and a second end opposite the first end of the pressure tube;
    a sealing and guiding device at a first end of the pressure tube;
    a guide tube arranged in the pressure tube;
    a piston guided in the guide tube that divides the pressure tube into a first work chamber and a second work chamber;
    a piston rod fastened by one end to the piston that extends through the second work chamber and is guided outward so as to be sealed by the sealing and guiding device at the first end of the pressure tube and is arranged with its other end at the base part of the vertical tube,
    wherein the second end of the pressure tube is remote from the piston rod;
    a spring element remote from the piston rod, the spring element having a first end at the second end of the pressure tube and a second end at the first end of the telescope tube, the spring element being configured to provide a force against the second end of the pressure tube and against the first end of the telescope tube to preload the pressure tube toward the second end of the telescope tube; and
    a valve in a flow connection between the first work chamber and the second work chamber, wherein the valve is configured to open and close the flow connection when actuated by an actuating device,
    wherein the pressure tube is arranged to be movable along a center longitudinal axis relative to the telescope tube.

2. The object support column according to claim 1, further comprising:
    a hollow rod that is guided out of the second end of the pressure tube and having a first portion extendable through an opening at the first end of the telescope tube,
    wherein the hollow rod is immovably fixed in the pressure tube.

3. The object support column according to claim 1, further comprising a guide ring at the first end of the telescope tube and a guide cup at the first end of the pressure tube, the gas spring being guided so as to be axially movable in the telescope tube by the guide ring and guide cup.

4. The object support column according to claim 2, wherein the hollow rod further comprises:
    a second portion adjoining the first portion, an outer diameter of the second portion having a greater outer diameter than an outer diameter of the first portion;
    a third portion adjoining the second portion, an outer diameter of the third portion being greater than the outer diameter of the second portion;
    a first step arranged between the first and second portions to limit compression of the spring element; and
    a second step arranged between the second and third portions, at the second end of the pressure tube.

5. The object support column according to claim 3, further comprising at least one stop device at the second end of the telescope tube,
    wherein the guide cup can be brought into contact with the stop device.

6. The object support column according to claim 1, wherein the spring element is configured and positioned so that the first end of the spring element bears against the second end of the pressure tube and the second end of the spring element bears against the first end of the telescope tube to preload the pressure tube toward the second end of the telescope tube.

* * * * *